May 13, 1924.

T. V. BUCKWALTER

SHAFT BEARING

Filed Oct. 29, 1923

1,493,598

Inventor:
Tracy V. Buckwalter,
by Carnot Carne,
His Attorneys

Patented May 13, 1924.

1,493,598

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

SHAFT BEARING.

Application filed October 29, 1923. Serial No. 671,345.

*To all whom it may concern:*

Be it known that I, TRACY V. BUCK-WALTER, a citizen of the United States, and a resident of the city of Canton, in the county of Stark and State of Ohio, have invented a new and useful Improvement in Shaft Bearings, of which the following is a specification.

This invention relates to bearings for the shafts of machinery such, for instance, as the oil containing bearing casing for the armature shaft of an electric motor. One of the principal objects of the present invention is to prevent the escape of lubricant from the bearing casing through the shaft receiving opening thereof during both forward and reverse rotation of the shaft. Another object is to prevent the entry of dust or other foreign matter into the casing through its shaft receiving opening during the forward rotation of the shaft. Other objects are simplicity and cheapness of construction and compactness of design. The invention consists principally in a bearing for a shaft wherein one of said members is formed with an annular groove and reversely inclined threads on opposite sides of said groove, whereby the escape of lubricant through the shaft receiving opening of said bearing is prevented regardless of the direction of rotation of said shaft, and the entry of foreign matter into said bearing through said opening is prevented during the forward drive. The invention also consists in the construction and arrangement of parts hereinafter described and claimed.

Figure 1:
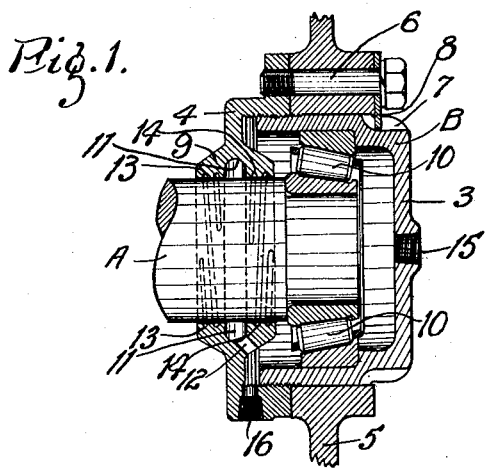
Figure 2:
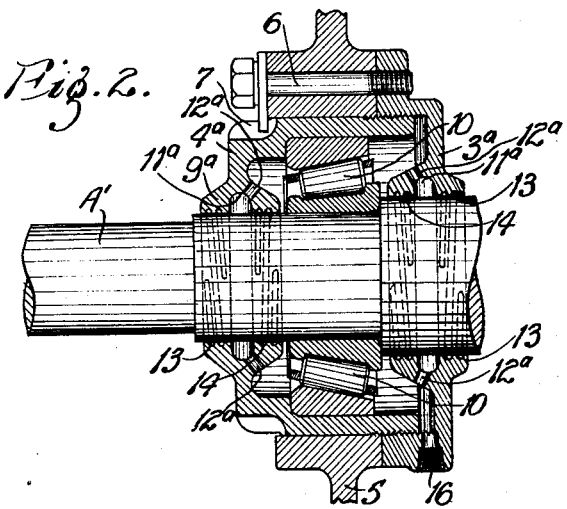

In the accompanying drawing, which forms part of this specification and wherein like symbols refer to like parts wherever they occur, Fig. 1 is a sectional view of a portion of an electric motor provided with an armature shaft and bearing embodying my invention; and Fig. 2 is a view similar to Fig. 1 showing a modified form of the invention.

For purposes of illustration, my invention is shown in connection with the armature shaft A and the oil containing bearing casing B of an electric motor. The bearing casing B comprises two cooperating cup-shaped members or sections 3 and 4 which are preferably threaded together. The cup section 3 of the hollow bearing casing B is mounted in an opening provided therefor in the standard or framework 5 of the motor; and the cup section 4 is secured to the side of said frame by means of cap-screws 6. The cup section 3 is threaded onto the cup section 4 and is provided at its outer corner with a series of notches 7 adapted to receive a locking piece or key in the form of a plate 8 which is removably secured in position by means of the cap-screw 6. The purpose of this finger 8 is to secure the cup section 3 against rotation. One end of the armature shaft A projects through a circular opening in the hub-like portion 9 in the cup member 4 of the bearing casing B and is preferably supported independently of the shaft opening by means of a conical roller bearing 10 mounted in the section 3 of said casing. This bearing may be adjusted to take up wear by rotating the cup section 3 in the proper direction. The cup section is locked in the desired adjusted position by means of the finger 8.

The shaft receiving opening m the hub portion 9 of the cup member 4 of the bearing casing is provided with an annular groove 11 which communicates with the interior of said bearing casing, near the bottom thereof, through a bleed hole or passageway 12. The shaft receiving opening in the hub portion 9 of the bearing casing is provided on each side of the annular groove 12 with a helical groove or internal thread. The outer thread 13 is inclined in a direction that will force back any dust or other foreign matter that tends to creep along the shaft and enter the bearing through the shaft receiving opening therein during the forward rotation of the shaft; and the inner thread 14 is inclined in a reverse direction so as to prevent the escape of oil through the shaft receiving opening during the forward rotation of said shaft. In other words, the shaft receiving opening in the bearing casing is provided on one side of the annular groove 11 with a left hand thread and is provided on the other side of said groove with a right hand thread. Thus, during the forward drive, the oppositely inclined helical grooves or threads operate to prevent entry of dust into the casing and the escape of oil therefrom through the shaft opening therein. In the reverse rotation of the armature shaft, oil that tends to escape from the bearing casing through the outer end of the shaft opening is checked by the outer threads 13 and thrown by centrifugal force into the annular groove 11 where it is returned to the bearing casing through the bleed hole 12 at the bottom of said annular groove. The bearing casing is provided with an oil filling opening that is closed by a threaded plug 15, thereby permitting said casing to be filled to the proper level with oil. A removable stopper or drain plug 16 is threaded into the bottom of the bearing casing for draining the oil when necessary.

In the modified construction shown in Fig. 2, the armature shaft A' passes through alined openings in the hub portions 9ª of the two sections 3ª and 4ª of the bearing casing B'. Each shaft opening is provided with an annular groove 11ª and oppositely inclined threads on each side of the groove. These threads are inclined in a direction that will prevent entry of dust into the bearing casing and the escape of oil therefrom through the shaft receiving openings at the ends thereof during the forward drive. During the reverse drive, the outer threads prevent the escape of oil from the casing through the shaft openings thereof by forcing the oil inwardly along the shaft into the annular grooves in the shaft openings where it is returned to the bearing casing through the bleed holes 12ª.

My invention is applicable to shaft bearings of various kinds and it is evident that changes may be made without departing from my invention. For instance, instead of the threads and annular groove being located in the shaft opening of the bearing, they may be located on the shaft, the operation of the threads and annular groove being substantially the same in both cases.

What I claim is:

1. The combination with a rotating shaft, of an oil containing bearing casing having an opening adapted to receive said shaft, one of said members being formed with an annular groove communicating with said casing and reversely inclined helical grooves on opposite sides of said annular groove adapted to prevent the escape of oil from said casing through said shaft opening during the forward and reverse rotation of said shaft.

2. The combination with a rotating shaft, of an oil containing bearing casing having an opening adapted to receive said shaft, said shaft opening being formed with an annular groove communicating with said casing and reversely inclined helical grooves on opposite sides of said annular groove, thereby preventing the entry of foreign matter into said casing through said shaft opening during the forward rotation of said shaft and the escape of oil from said casing through said shaft opening during the forward and reverse rotation of said shaft.

3. The combination with a rotating shaft, of an oil containing bearing casing having an opening adapted to receive said shaft and means independent of said shaft openings for rotatably supporting said shaft in said casing, said shaft opening being formed with an annular groove whose lower portion communicates with the lower portion of said casing and reversely inclined helical grooves on opposite sides of said annular groove, said helical grooves being inclined in directions that prevent entry of oil into said shaft opening during the forward and reverse rotation of said shaft.

4. The combination with a rotating shaft, of an oil containing bearing casing having an opening at each end for receiving said shaft, said shaft openings being each provided with an annular groove communicating with the interior of said casing and reversely inclined helical grooves adapted to prevent the escape of oil from said bearing through said shaft openings in the forward and reverse rotation of said shaft.

5. The combination with a rotating shaft, of an oil containing bearing casing having an opening at each end for receiving said shaft, means independent of said shaft for rotatably supporting said shaft in said bearing, said shaft openings being each provided with an annular groove communicating with the interior of said casing and reversely inclined helical grooves adapted to prevent the entry of foreign matter into said casing through said openings in the forward rotation of said shaft and the escape of oil from said bearing through said shaft openings in the forward and reverse rotation of said shaft.

6. The combination with a rotating shaft, of an oil containing bearing casing comprising cup-shaped sections detachably secured together, one of said sections having an opening for receiving said shaft, means in the other of said sections for rotatably supporting said shaft independently of the shaft opening in said first mentioned section, said shaft opening being formed with an annular groove communicating with the interior of said casing and reversely inclined helical grooves on opposite sides of said annular groove adapted to prevent the escape of oil from said casing through said shaft openings during the forward and reverse rotation of said shaft.

7. The combination with a rotating shaft, of an oil containing bearing casing comprising cup sections detachably secured together, each of said sections having an opening for receiving said shaft, means in one of said sections for rotatably supporting said shaft independently of said shaft openings, said shaft openings being each provided with an annular groove communicating with the interior of said casing and oppositely inclined helical grooves on opposite sides of said annular groove, said helical grooves being inclined in directions adapted to prevent the escape of oil from said casing through said shaft openings during the forward and reverse rotation of said shaft.

8. The combination with a rotating shaft, of an oil containing bearing casing having an opening adapted to receive said shaft, one of said members being formed with a groove and reversely inclined helical grooves on opposite sides of said groove adapted to prevent the escape of oil from said casing through said shaft opening during the forward and reverse rotation of said shaft, said casing having a passageway extending from the interior thereof to said groove.

Signed at Canton, Ohio, this 24 day of Oct., 1923.

TRACY V. BUCKWALTER.